United States Patent
Machesney

(10) Patent No.: US 7,589,508 B2
(45) Date of Patent: Sep. 15, 2009

(54) LOW-NOISE SWITCHING VOLTAGE REGULATOR AND METHODS THEREFOR

(75) Inventor: Brian Machesney, Craftsbury Common, VT (US)

(73) Assignee: Altera Corporation, San Jose, CA (US)

( * ) Notice: Subject to any disclaimer, the term of this patent is extended or adjusted under 35 U.S.C. 154(b) by 248 days.

(21) Appl. No.: 11/332,290

(22) Filed: Jan. 17, 2006

(65) Prior Publication Data
US 2006/0158163 A1 Jul. 20, 2006

Related U.S. Application Data

(60) Provisional application No. 60/644,024, filed on Jan. 18, 2005.

(51) Int. Cl.
*G05F 1/00* (2006.01)
(52) U.S. Cl. ...................... 323/282; 323/246
(58) Field of Classification Search ................ 323/246, 323/243, 241, 265, 266, 274, 275, 284, 285
See application file for complete search history.

(56) References Cited

U.S. PATENT DOCUMENTS

| | | | |
|---|---|---|---|
| 5,808,453 A | 9/1998 | Lee et al. | |
| 6,144,194 A | 11/2000 | Varga | |
| 6,246,222 B1 * | 6/2001 | Nilles et al. | 323/283 |
| 6,670,794 B1 * | 12/2003 | Wang et al. | 323/213 |
| 6,703,812 B1 * | 3/2004 | Lethellier | 323/222 |
| 6,870,152 B2 * | 3/2005 | Ralph et al. | 250/227.18 |
| 6,943,535 B1 * | 9/2005 | Schiff | 323/246 |
| 7,034,511 B2 * | 4/2006 | Schuellein et al. | 323/272 |
| 7,227,731 B2 * | 6/2007 | Leith et al. | 361/93.1 |
| 2004/0145845 A1 * | 7/2004 | Schuellein | 361/93.1 |
| 2004/0196019 A1 * | 10/2004 | Schneider | 323/285 |
| 2006/0152205 A1 * | 7/2006 | Tang et al. | 323/284 |

OTHER PUBLICATIONS

PCT International Search Report and Written Opinion in counterpart International Application No. PCT/US06/01146, dated Nov. 19, 2007.

* cited by examiner

*Primary Examiner*—Akm E Ullah
*Assistant Examiner*—Nguyen Tran
(74) *Attorney, Agent, or Firm*—Edell, Shapiro & Finnan, LLC

(57) ABSTRACT

Several techniques are provided to increase the efficiency and reduce the EMI of produced by a multiphase switching voltage regulator. According to one technique, a multiphase switching voltage regulator is controlled by varying in time the duration and/or position of each switching pulse for each of a plurality of channels of the switching voltage regulator in response to one or more signals representing a state of each of a plurality of channels of the voltage regulator. According to a second technique, a method is provided for controlling a multiphase switching voltage regulator comprising operating each channel of the voltage regulator at a different frequency. The timing of the switching pulses to each channel is scheduled to avoid time-overlap of switching pulses for two or more channels.

29 Claims, 9 Drawing Sheets

LOW-NOISE SWITCHING VOLTAGE REGULATOR AND METHODS THEREFOR

RELATED APPLICATION

This application claims priority to U.S. Provisional Application No. 60/644,024, filed Jan. 18, 2005, the entirety of which is incorporated herein by reference.

BACKGROUND OF THE INVENTION

The present invention relates to a voltage regulator for a power supply device, and more specifically to an improved low noise voltage regulator using digitally controlled switching techniques.

Switching voltage regulators are commonly used in power supply devices, such as those used in consumer appliances, e.g., personal computers, electronic appliances, etc. FIG. 1 generally illustrates the form of a current evolution of a three-phase voltage regulator shown at reference numeral 10 designed for better line and load regulation.

A three-phase voltage regulator 10 comprises a single pulse width modulation (PWM) control integrated circuit (IC) 20 and three channels 30(1), 30(2), and 30(3). Each channel 30(i) comprises a driver circuit 40(i), a high-side supply transistor 42(i), a low-side sink transistor 44(i) and an energy-storage inductor 46(i). In operation, the PWM control IC turns on each individual transistor in the channels on a synchronized schedule to manage the timing of the storage of energy in the resonant circuit formed by the corresponding inductor in that channel and a common capacitor 48 shared by all of the channels.

Exemplary waveforms for the three-phase switching voltage regulator system 10 are shown in FIG. 2 and illustrate the concept of interleaved switching to control the voltage regulator output. The width of each PWMn pulse (PWM1, PWM2, PWM3) controls the duration of the conduction period for the respective high-side supply transistors 42(i) in the corresponding channel 30(i). When each PWMn pulse is low, the respective low-side sink transistor 44(i) conducts in the corresponding channel 30(i). The driving signal to the low-side sink transistor 44(i) may optionally be derived separately from the driving signal for the high-side source transistor 42(i) so that its timing may be independently adjusted. Using well-known pulse width modulation techniques, the width of each PWMn pulse is adjusted to control the amount of energy stored in the inductor for the associated channel. This in turn controls the transfer of that energy to the common capacitor and, consequently the output voltage of the regulator. The positive series reactance of the separate channel inductors and the negative reactance of the shared capacitor also provide a filtering action that removes switching artifacts from the regulator output, providing a relatively steady, direct-current (DC) voltage.

The purpose of the low-side transistor 44(i) is to supply current to the corresponding inductor 46(i) from the circuit ground, when the current supplied by the high-side source transistor 44(i) is off. If the low-side transistor current path was not provided, the voltage on the "near side" of the inductor 46(i) would rise until it broke down a path to a current source. This is a result of the fact that the current through an inductor must be continuous, but the voltage across it may change instantaneously.

The low-side transistor needs to be turned off sufficiently in advance of the high-side transistor being turned off to avoid the voltage breakdown problem. This results in "shoot-through" current from the regulator input voltage to ground through the two transistors, which reduces the regulator's overall efficiency.

Several advantages can be realized by increasing the frequency of the driving signal pulses and the number of phases in the voltage regulator. Since the resonant frequency of the separate channel inductors and the common capacitor is given by, $$f_{PWM} = \frac{1}{2\pi\sqrt{L_{channel}C_{common}}}$$

Increasing the pulse frequency allows reduction of the values of the inductors and capacitor to provide equivalent filtering of switching artifacts in the regulator's output. Use of smaller inductors and capacitors eases physical placement constraints and reduces the total circuit area consumed by inductors and capacitors.

With more phases, less current is required of each channel because the total current is shared across more channels, reducing energy loss and heat generation resulting from both conductor losses in the inductor wiring and flux losses in the inductor's magnetic core material. Decreasing the current switched at any instant in time also reduces the amount of electromagnetic interference (EMI) that the circuit generates and allows the switching transistors to be air-cooled while mounted in a vertical position to further save circuit board area.

Operating more phases necessitates reduction of the maximum duty cycle of each individual phase to prevent the time overlap of signals in any two phases which would interrupt the proper scheduling of energy delivery from the separate inductors in each channel to the common capacitor. According to Fourier theory, reducing the duty cycle of a pulse train increases the range of frequencies over which the spectral energy produced by the pulse train is spread. This reduces the amount of spurious energy produced at any single frequency.

Nevertheless, increasing the pulse frequency and the number of phases places more stringent constraints on the timing of individual PWMn pulses. A common two-phase system operating at 200 KHz requires a PWMn pulse to be generated every 2.5 µs. Controlling pulse width to within 1% to provide the necessary load regulation requires timing control of 25 ns. Likewise, a sixteen-phase system operating at 10 MHz to realize the benefits described above requires timing control of 62.5 ps, which is well beyond the capabilities of today's digital multiphase switching voltage regulator systems. Even more precise control of separate driving signals to the high-side source transistor and the low-side sink transistor must be maintained to prevent voltage breakdown of the transistors while reducing efficiency losses due to shoot-through current from the regulator input to ground through the two transistors. Moreover, the repeated generation of the energetic PWMn pulses produces EMI at both the fundamental frequency of the pulse generation, the inverse of the repetition rate, and at harmonics of this frequency.

There is room for significantly improving voltage regulators and more particularly to reducing EMI and enhance performance of a switching voltage regulator. By monitoring the state of the voltages across the high-side and low-side transistors and taking advantage of precise timing capability, it is possible to increase the efficiency of the voltage regulator without exposure to voltage breakdown.

SUMMARY OF THE INVENTION

Briefly, several techniques are provided to increase the efficiency and reduce the EMI produced by a multiphase switching voltage regulator. According to one technique, a multiphase switching voltage regulator is controlled by varying in time the duration and/or position of each switching pulse for each of a plurality of channels of the switching voltage regulator in response to one or more signals representing a state of each of a plurality of channels of the voltage regulator.

According to another technique, a method is provided for controlling a multiphase switching voltage regulator comprising operating each channel of the voltage regulator at a different frequency. The timing of the switching pulses to each channel is scheduled to avoid time-overlap of switching pulses for two or more channels.

Other objects and advantages will become more apparent when reference is made to the following description taken in conjunction with the accompanying drawings.

DETAILED DESCRIPTION

Figure 1:
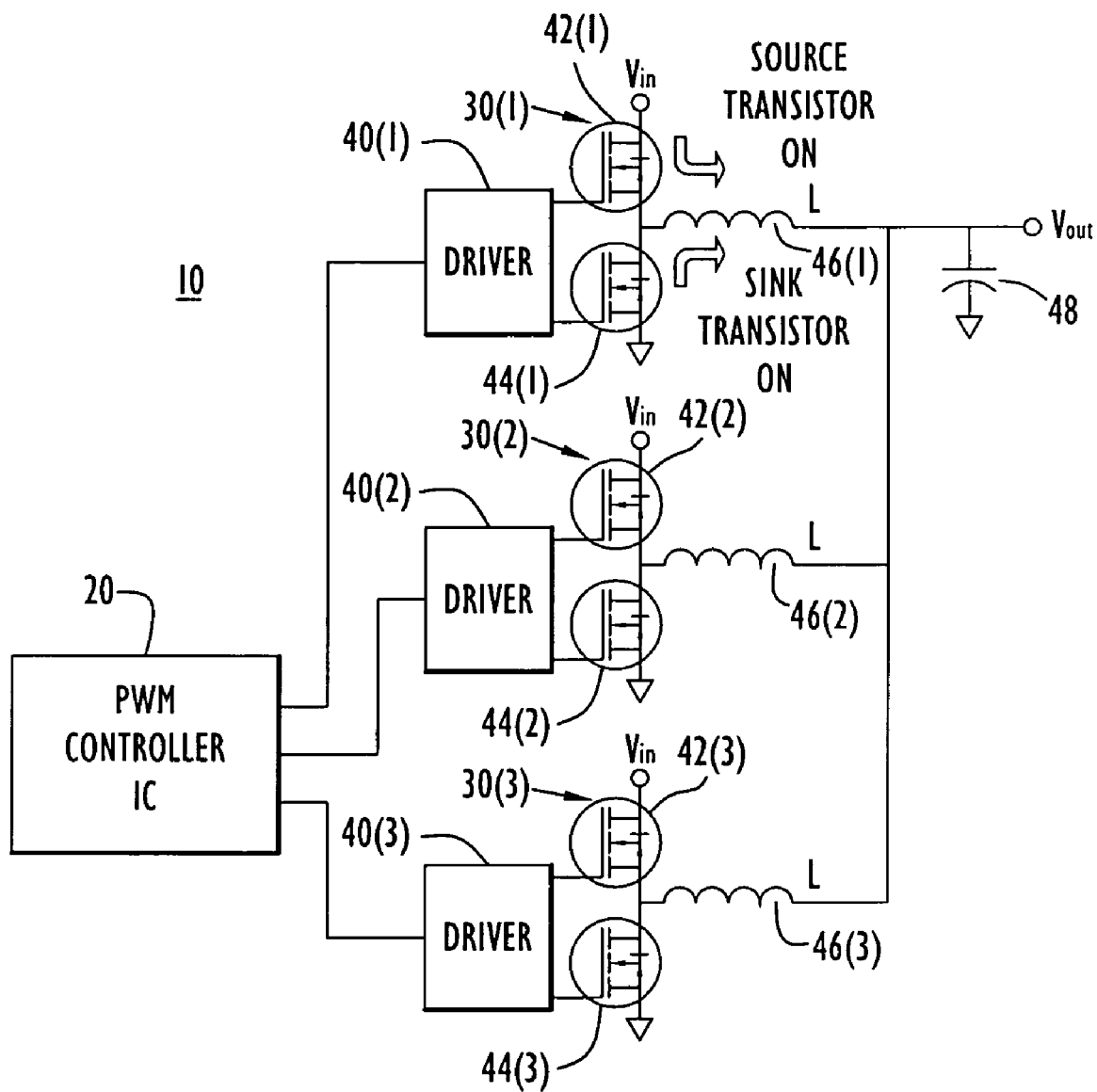
FIG. 1 is a schematic diagram of a prior art three-phase switching voltage regulator.
Figure 2:
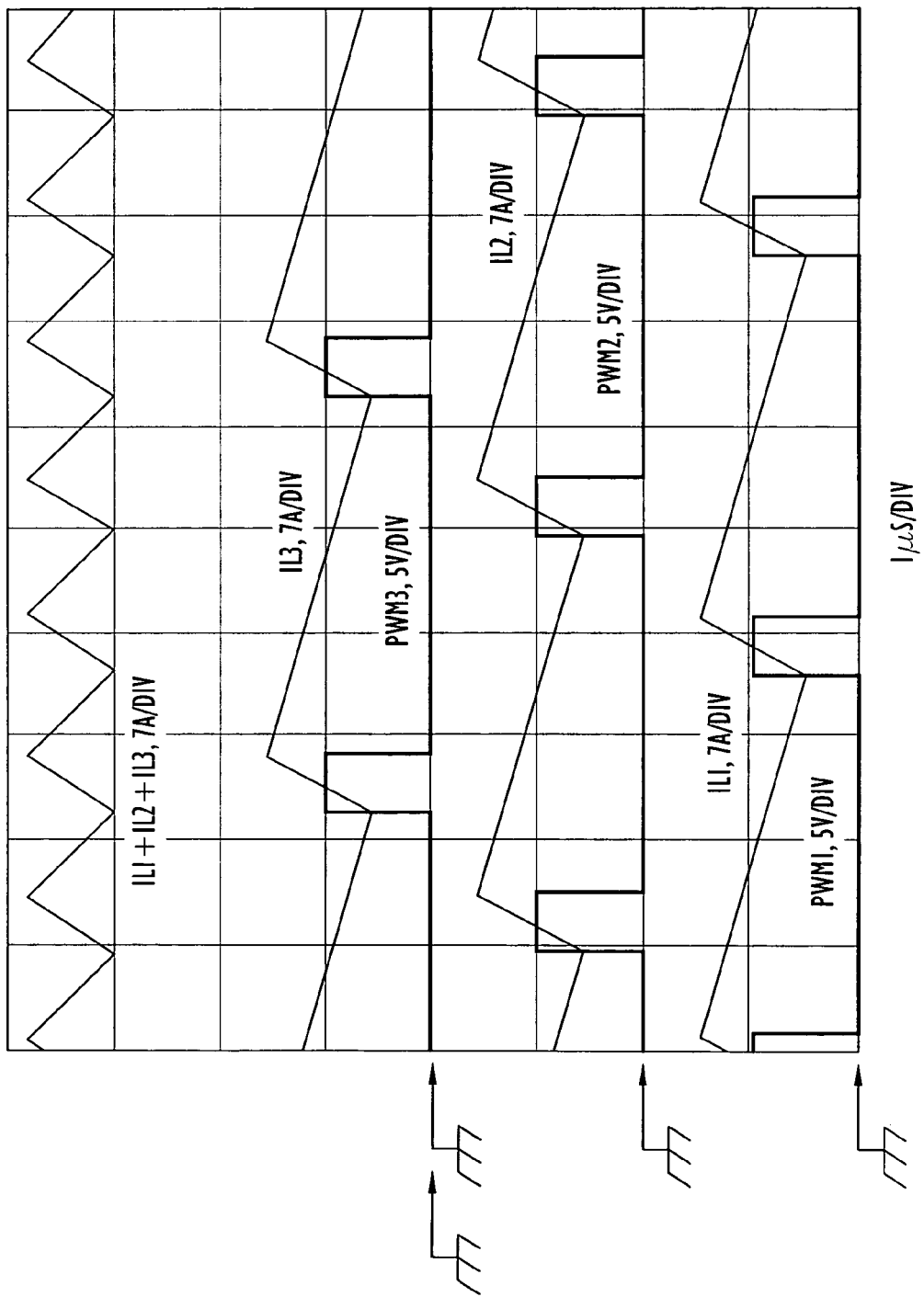
FIG. 2 is a timing diagram of the waveforms for an interleaved switching control of a three-phase voltage regulator according to the prior art.
Figure 3:
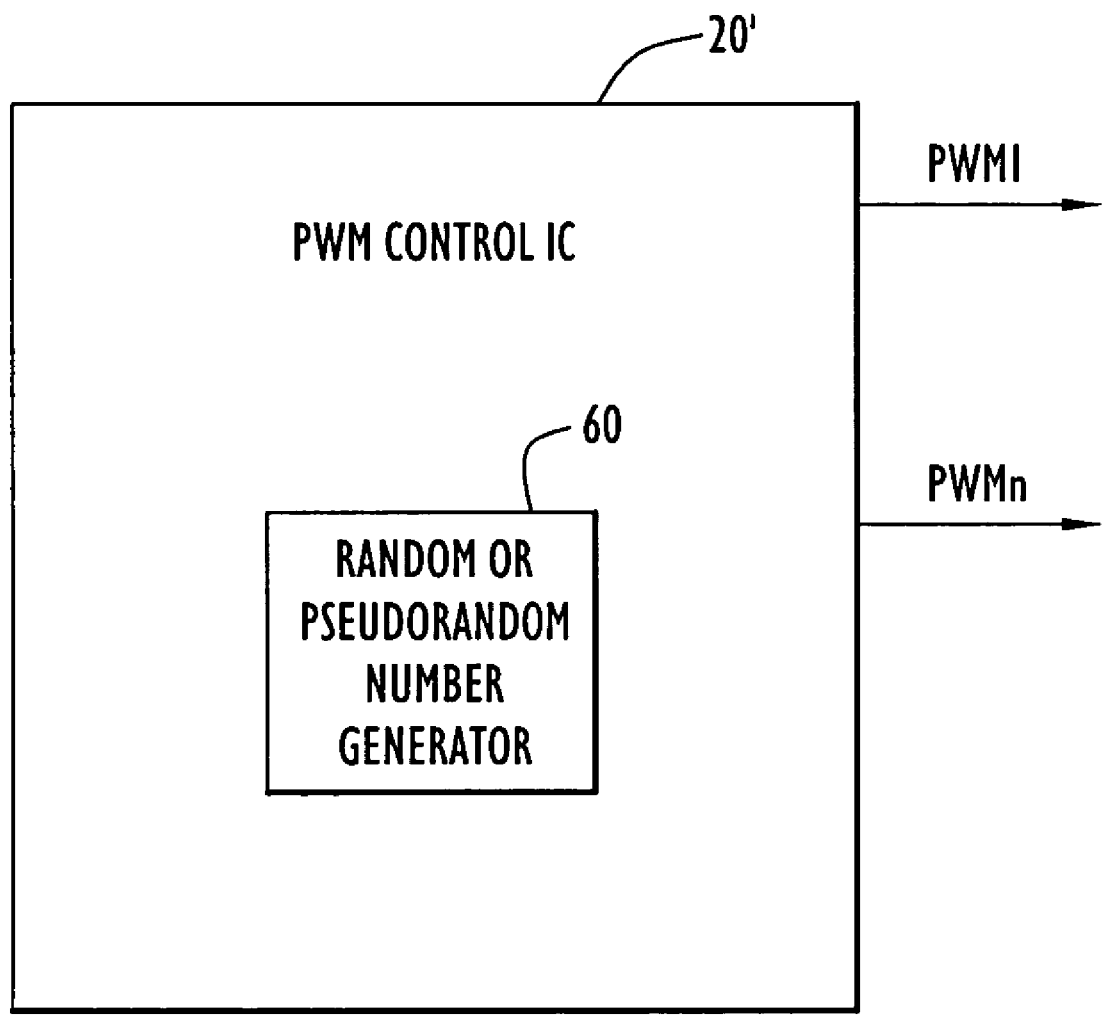
FIG. 3 is a block diagram of a control circuit for a switching voltage regulator according to a first embodiment of the present invention.
Figure 4:
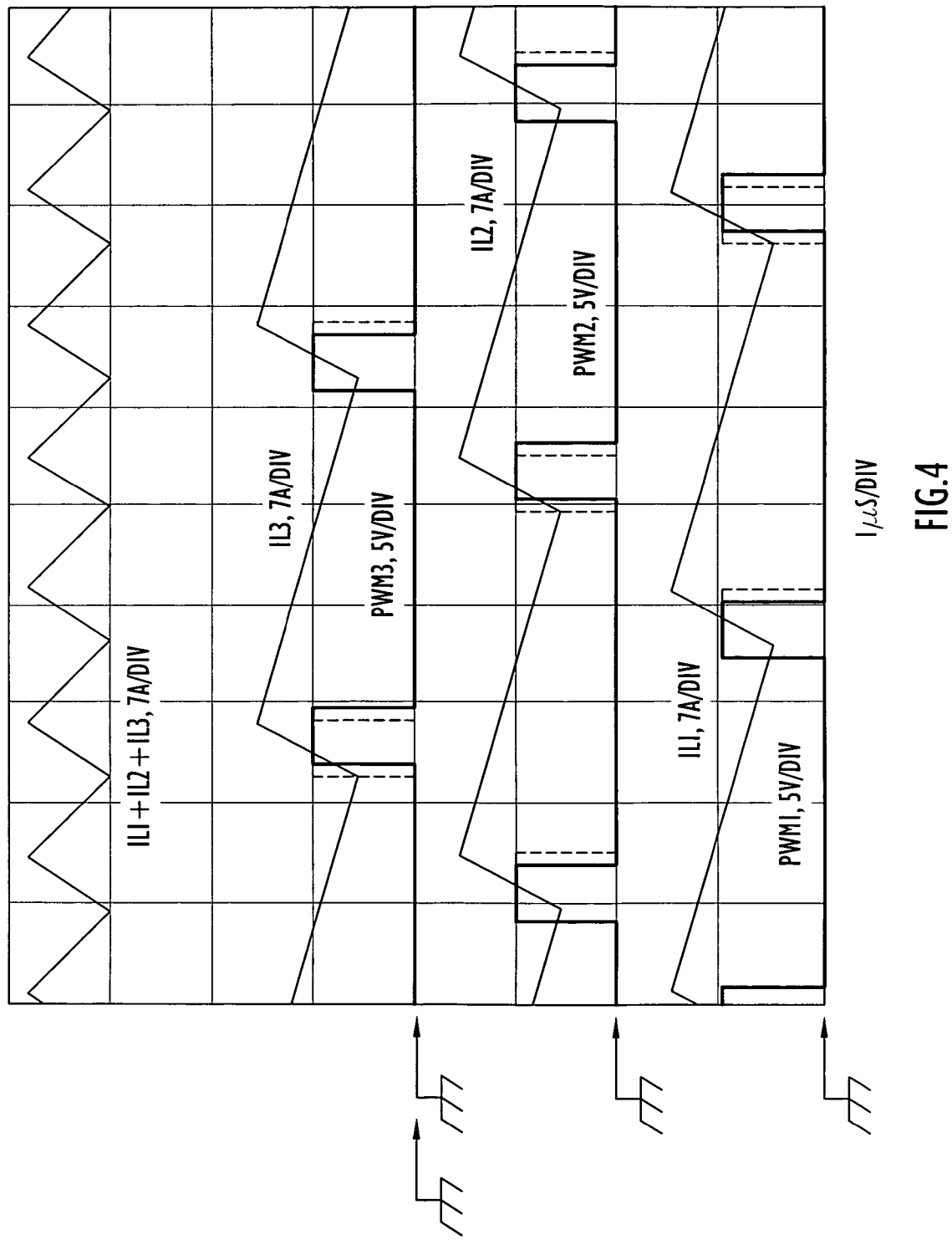
FIG. 4 is a timing diagram that illustrates a technique for randomly or pseudo-randomly varying the position in time of each switching pulse in a voltage regulator to reduce electromagnetic interference (EMI) according to the first embodiment of the present invention.

Referring first to FIGS. 3 and 4, a first embodiment or aspect of the invention is described. According to the first embodiment of the invention, the positions in time of the PWMn pulses to the high-side source transistors 42 and low-side sink transistors 44 in each channel of the voltage regulator are slightly varied to spread electromagnetic interference (EMI) over a wider band of spectrum. Subtle adjustments to the position in time of each PWMn pulse as shown by the dotted black lines in FIG. 4 are made to reduce the amount of EMI on any given frequency. Rather than varying this adjustment in a periodic way akin to spread-spectrum modulation, the PWM control circuit 20' uses the random or pseudo-random number generator 60 to impose random or pseudo-random adjustment to the position in time and width (duration) of each pulse PWM1 to PWMn. FIG. 4 shows the example where n=3, but of course this can be generalized to any one or more phases of a switching voltage regulator. Random or pseudo-random adjustment reduces EMI without simply creating sidebands of energy displaced by the frequency of the spread-spectrum modulation from the PWM generation frequency and its harmonics as would be the case if the positions were varied in a periodic way.

EMI may be further reduced at any given frequency and better spread across a spectrum by operating each regulator channel at a different frequency. Thus, according to a second embodiment of the invention, the frequency of the pulses for each of the channels is different, and because the pulse frequencies are different the pulses are scheduled so as to avoid overlap in time of the pulses across the channels. The techniques of the first and second embodiments may be combined so as to introduce random or pseudo-random adjustment to the occurrence and width (duration) of the different frequency pulses.

Adding such capabilities in a PWM control circuit increases the burden of controlling the timing of PWM pulses by another order of magnitude to 6.25 ps and increases the number of individual synthesizers in the PWM control circuit. Implementing these capabilities using analog pulse generators may be cost-prohibitive for certain applications, while using so-called delay-locked loops may not provide the necessary level of timing control.

A digital arbitrary waveform synthesizer (AWS) may be used in a PWM control circuit to control the position of the pulses in each of the channels to prevent time-overlap, and to generate the pulse positions to prevent overlap in a multi-frequency channel voltage regulator system. An example of an AWS is disclosed in commonly assigned U.S. Pat. Nos. 6,377,094 and 6,664,832, entitled "Arbitrary Waveform Synthesizer Using a Free-Running Oscillator". The entirety of each of these patents is incorporated herein by reference.

The different frequencies for the control pulses may be implemented by choosing an inductor value for each channel that corresponds to the frequency at which that channel operates. For example, channel 1 may have an inductor $L_1$ of a certain value to operate at frequency $f_1$, channel 2 may have an inductor $L_2$ of a certain value to operate at frequency $f_2$, and so on. Operating each channel at a different frequency further reduces the amount of EMI at any given frequency. Because the frequency of each channel is different, two or more of the PWM pulses could overlap in time unless properly scheduled not to do so. Logic is provided in the PWM control circuit to provide the precise control of the position in time of each pulse to prevent these overlaps and therefore prevents producing undesirable spikes in the output voltage. Significant improvements in voltage regulation operation can be realized by monitoring the state of each of the voltage regulator channel output signals and adjusting the timings and widths of the PWM pulses to achieve outputs as close as possible to the ideal.

Figure 5:
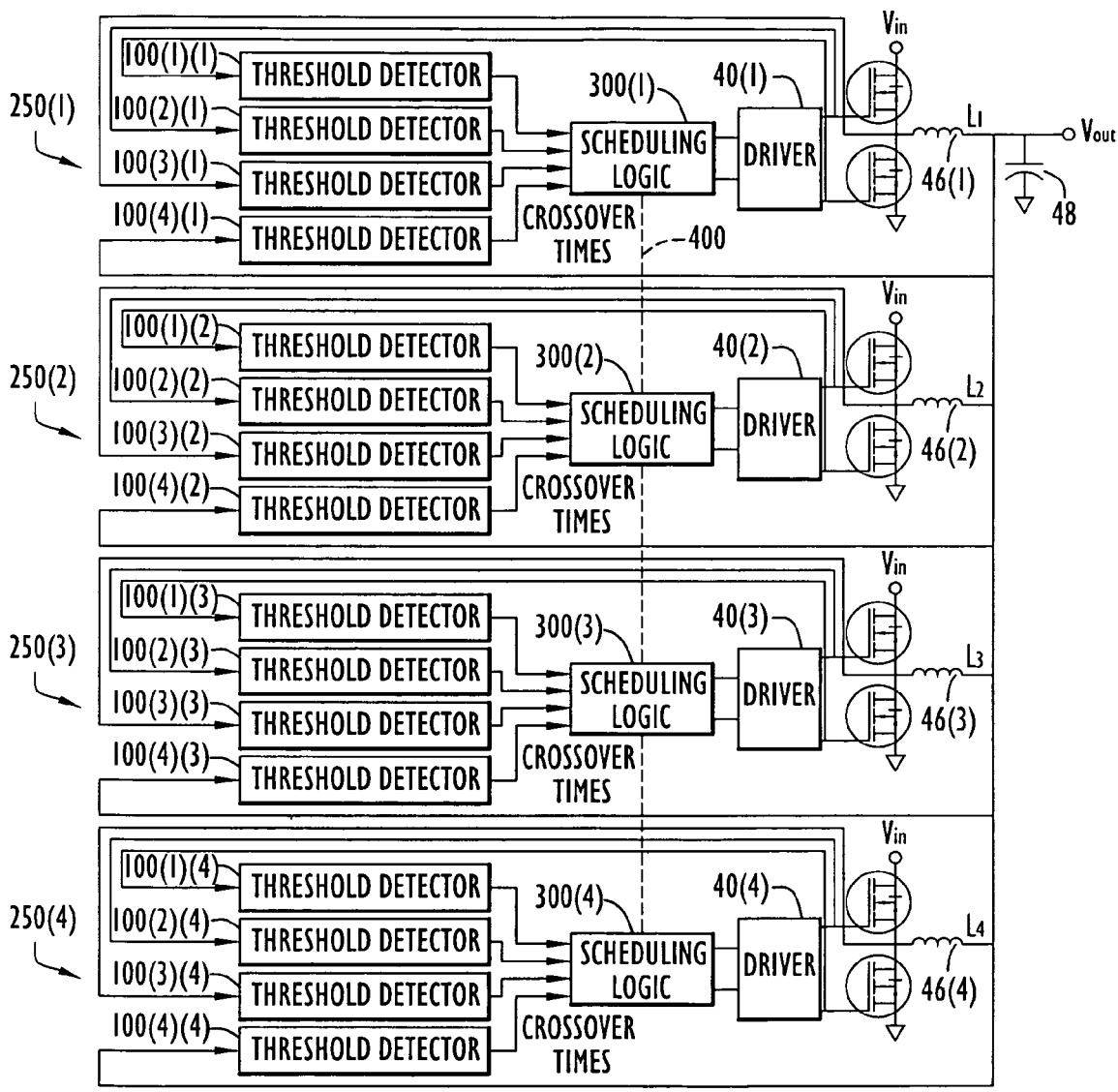
FIG. 5 is a block diagram of a switching voltage regulator system in which each channel is operated at a different frequency according to a second embodiment of the present invention.

An example of a 4-phase switching voltage regulator system 200 is shown in FIG. 5. As indicated above, each channel operates at a different frequency by using different values of inductors, $L_1$, $L_2$, $L_3$ and $L_4$. The voltage regulator system 200 monitors the state of each channel or phase as well as the output voltage $V_{OUT}$. There are many ways to monitor the state of each phase of the voltage regulator. One way is to monitor the signals from the driver circuit 40(i) to the high side transistor 42(i) and the low side transistor 44(i) and the voltage on the near side of the inductor $L_i$ as shown in FIG. 5. To this end, control circuitry is provided for each channel "i" including a network 250(i) of threshold detector circuits and scheduling logic component 300(i). The threshold detector network 250(i) for each channel "i" includes threshold detector 100(1)(i) that monitors the output voltage $V_{OUT}$, threshold detector 100(2)(i) that monitors the driver circuit signal to the high side transistor 42(i), threshold detector 100(3)(i) that monitors the driver circuit signal to the low side transistor 44(i) and threshold detector 100(4)(i) that monitors the voltage of the near side of inductor Li.

The outputs of the network of threshold detectors 100(1)(i), 100(2)(i), 100(3)(i) and 100(4)(i), for i=1 to n, are connected to the corresponding scheduling logic component 300(i). The scheduling logic component 300(i) takes in the channel "i" state information from the threshold detector network 250(i) and generates the driver control signal PWMi, where each pulse train PWMi is at a different frequency. Electrical communication between the scheduling logic components 300(i), shown by dotted line 400 between the scheduling logic components 300(i) is provided so that the scheduling logic components 300(i) output the driver control signal pulses to avoid any overlap in time between two or more pulses in different channels. Moreover, the scheduling logic component 300(i) may introduce slight random or pseudo-random timing adjustments to the pulses as well to achieve the associated benefits described above in conjunction with FIGS. 3 and 4.

FIG. 5 shows two connections between each scheduling logic component 300(i) and the corresponding driver circuit 40(i) in the event that the driver circuit 40(i) is capable of separately controlling the high-side transistor 42(i) and low-side transistor 44(i) to prevent "shoot-through" current. In that case, the scheduling logic 300(i) generates two PWM signals, one for the high-side transistor and one for the low-side transistor.

Figure 6:
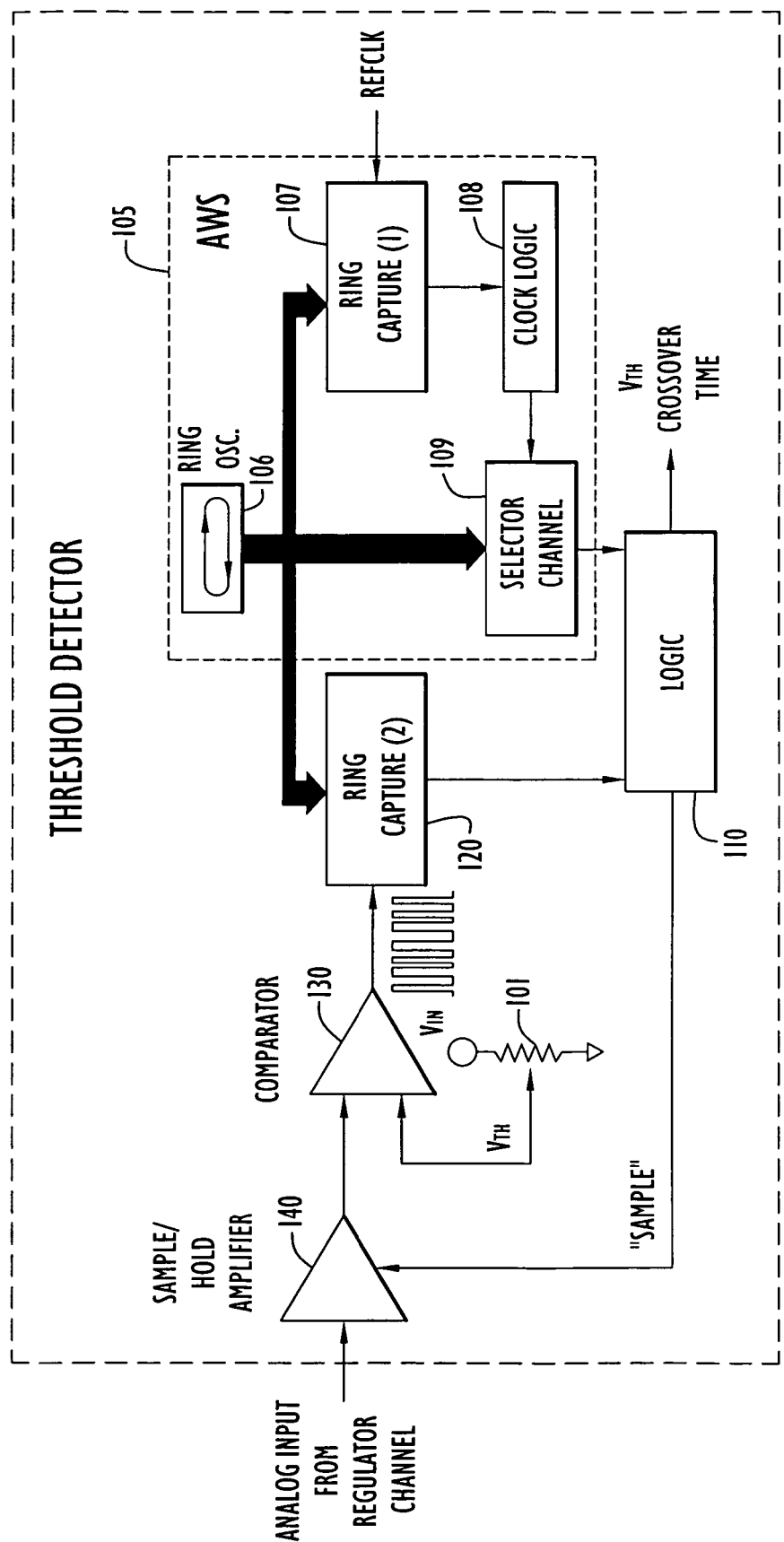
FIG. 6 is a block diagram of a threshold detector circuit in the switching voltage regulator system shown in FIG. 5.

Turning to FIG. 6, an example of a threshold detector used in the threshold detector networks 250(i) is shown. The threshold detector compares an input analog signal value from the switching voltage regulator to a programmable DC threshold value ($V_{TH}$), shown as rheostat 101, and outputs the time at which the input analog signal value crosses the threshold $V_{TH}$. The threshold value may be different depending on which analog signal value is being monitored by the threshold detector (output voltage, high side transistor, low side transistor or voltage at inductor).

The threshold detector comprises an AWS component 105, a logic circuit 110, a ring capture circuit 120, a comparator 130 and a sample/hold amplifier 140. The AWS 105 comprises a ring oscillator 106, a ring capture circuit 107, clock logic 108 and a selector channel circuit 109. The function of the AWS 105 is to very precisely measure the frequency of the ring oscillator 106 and to supply a timing calibration signal to the logic circuit 110. The sample/hold amplifier 140 receives as input the analog signal to be monitored and holds a sample value in response to the "sample" signal from the logic circuit 110. The comparator 130 compares the sample and held signal value with the threshold $V_{TH}$ and produces a pulse when the signal value crosses the threshold $V_{TH}$. The ring capture circuit 120 outputs a threshold crossing event signal that represents the time, with respect to the ring oscillator 106 in the AWS 105 that the comparator 130 outputs the pulse associated with the threshold crossing. The logic circuit 110 processes the timing calibration signal from the AWS 105 and the threshold crossing event signal from the ring capture circuit 120 and outputs a very precise threshold crossover time for that analog signal input to the threshold detector. The threshold detector is essentially a one-bit analog-to-digital converter (ADC). The rheostat 101 that supplies a DC threshold value may be replaced with a timed sawtooth ramp to allow for a more general, multi-bit ADC operation.

The channel state information for each channel "i" of the voltage regulator 200 is represented by the threshold crossover times output by the corresponding network 250(i) of threshold detectors. With knowledge of the times at which the threshold crossings occur, the scheduling logic 300 adjusts the timing and widths of the PWMn pulses in order to optimize the output of the switching regulator system 200.

Figure 7:
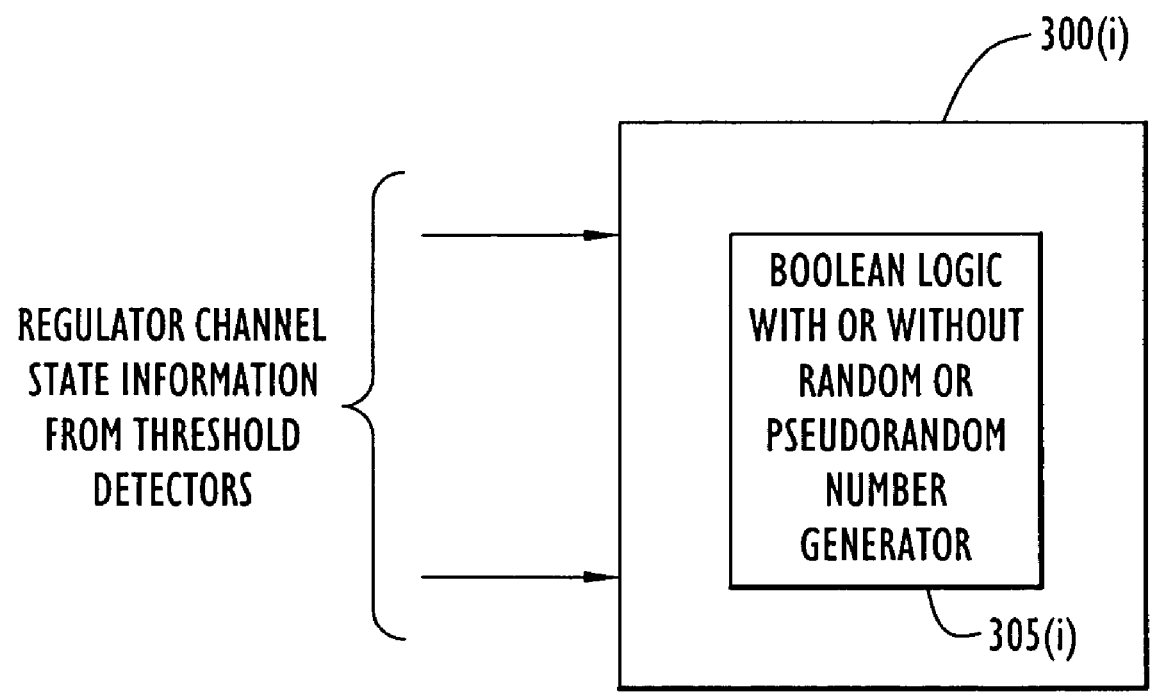
FIG. 7 is a block diagram of a scheduling logic circuit useful in the switching voltage regulator system shown in FIG. 5 according to an embodiment of the invention.

Turning to FIG. 7, one form of the scheduling logic component 300(i) for each channel "i" comprises Boolean logic 305(i) configured to output the PWMn pulses, each at a different frequency, and scheduled so as to avoid overlap in time. In addition, the Boolean logic 305(i) may optionally implement the random or pseudo-random number generation to perform the slight adjustment to PWM pulse positions as described above in conjunction with FIGS. 3 and 4.

Figure 8:
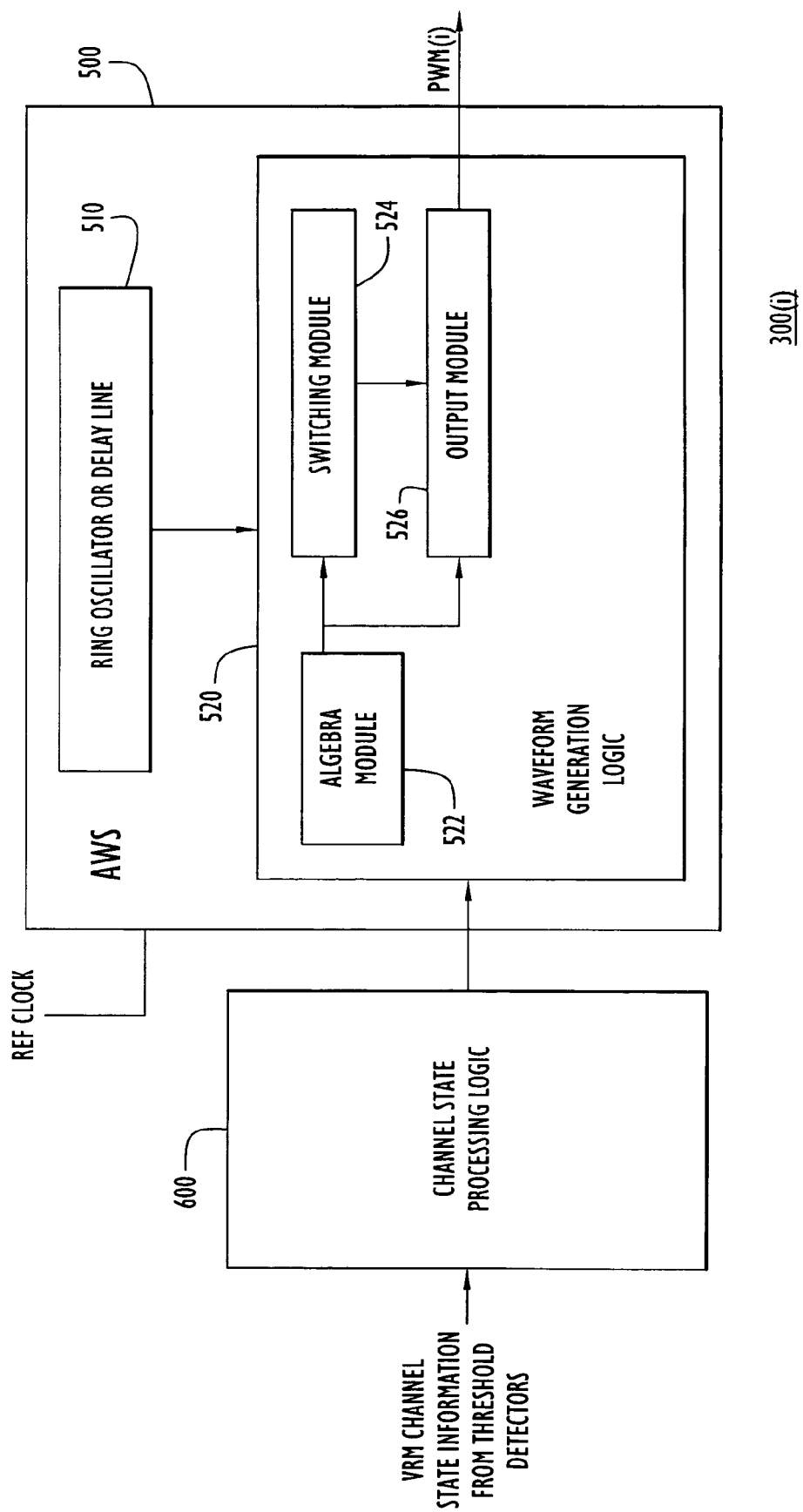
FIG. 8 is a block diagram of a scheduling logic circuit useful in the switching voltage regulator system shown in FIG. 5 according to another embodiment of the invention.

FIG. 8 illustrates another form of the schedule logic 300. In this form, the scheduling logic 300 comprises an AWS subsystem 500 and a channel state processing logic circuit 600. The AWS subsystem 500 comprises a ring oscillator or delay line 510 tapped by waveform generation logic block 520. The waveform generation logic block 520 comprises an algebra module 522, and a switching module 524 and an output module 526. The algebra module 522 is connected to the switching module 524 and output module 526.

The ring oscillator or delay line circuit 510 comprises a plurality of delay elements and a plurality of taps disposed between the delay elements, each tap providing a tap transition signal. The algebra module 522 has an algebra data input port, a clock input port that is coupled to a reference clock signal and an algebra data output port. The algebra module 522 generates a first signal at the algebra data output port in response to a second signal received at the algebra data input port, the first signal indicative of a first rising edge of an arbitrary waveform. The switching module 524 has a switch input port in electrical communication with the algebra data output port, a plurality of switch tap input ports in electrical communication with the plurality of taps of the delay line circuit 510, and a switch output port. The switching module 524 provides at the switch output port a selected transition signal corresponding to the tap transition signal provided from one of the plurality of taps selected in response to the first signal received at the switch input port. The output module 526 has a transition signal input port in electrical communication with the switch output port, a window input port in electrical communication with the algebra data output port and a waveform output port in electrical communication with the clock input port of the algebra module. The output module 526 generates the arbitrary waveform at the waveform output port in response to the selected transition signal received at the transition signal input port of the output module and the first signal received at the window input port. Further details for implementation and operation of the blocks of the AWS 500 can be found in the aforementioned commonly assigned patents.

The channel state information from the threshold detector network 250(i) is supplied to the channel state processing logic circuit 600. The channel state processing logic circuit 600 converts the threshold crossing time information for each channel of the switching voltage regulator to a control signal that is coupled to the output module 526 to in the waveform generation logic block 520. The output module 526 responds to the control signal to adjust a duration (width) or timing of its output signal, which corresponds to PWM(i) for channel "i". In addition, the scheduling logic components for all of the channels are connected to each other so that the channel state processing logic 600 in each scheduling logic component knows the timing considerations of the other channels. Thus, in each scheduling logic component 300($i$), the AWS 500 can precisely produce the driver circuit control pulse signal for that channel at a different frequency from the other channels and such that no two driver control signal pulses for different channels overlap in time. Furthermore, if the scheduling logic component 300($i$) is to generate two driver circuit control signals, one for the high-side transistor and one for the low-side transistor, the waveform generation logic block 520 would include another switching module and associated output module. One switching module/output module pair is for the driver control signal for the high-side transistor and the other switching module/output module pair is for the driver control signal for the low-side transistor. In addition, the channel state processing logic 600 would generate two control signals, one that is coupled to the output module for the high-side transistor driver control signal and one that is coupled to the output module for the low-side transistor driver control signal.

Figure 9:
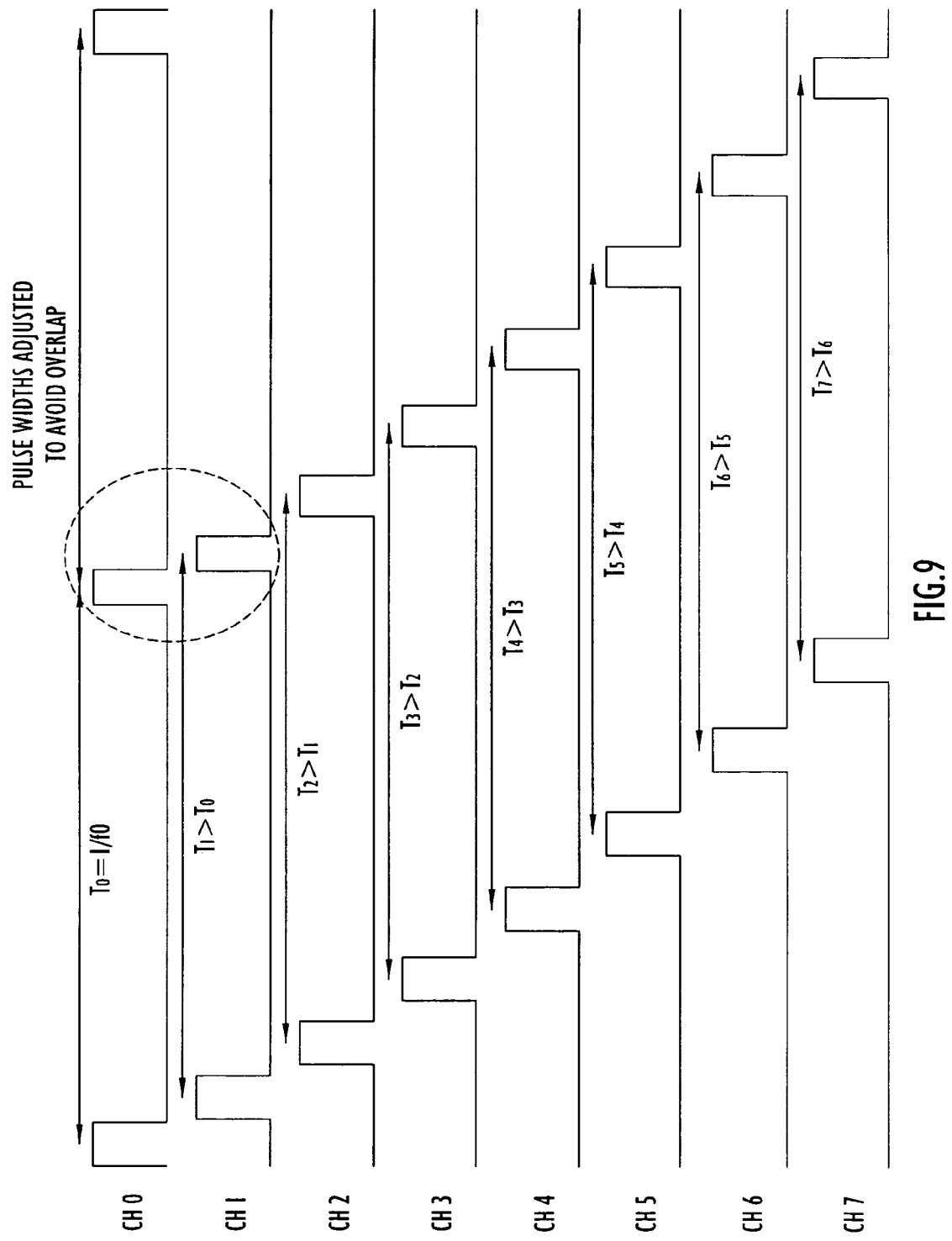
FIG. 9 is a timing diagram depicting operation of the switching voltage regulator system shown in FIG. 5.

FIG. 9 illustrates an example of the driver control pulse signals PWM0 to PWM7 for an eight-phase voltage regulator system using the techniques described above in connection with FIGS. 5-8. In this example, the frequency of each of the driver control pulse train signals is different and moreover the widths. Moreover, as indicated in the figure for channel 0 and channel 1, the width of the pulses are adjusted, when and as necessary, to avoid time overlap. In the case where the driver circuits 40($i$) are capable of separately controlling their respective high-side and low-side transistors, there would be two such waveforms for driver circuit control signals, one for the high-side transistor and one for the low-side transistor, for each channel.

The above description is intended by way of example only.

What is claimed is:

1. A method for reducing electromagnetic interference of a multiphase switching voltage regulator at any given frequency of the switching voltage regulator, comprising: varying the position in time of each switching pulse supplied to each of a plurality of channels of the switching voltage regulator with respect to a switching cycle for each of the plurality of channels of the switching voltage regulator to reduce electromagnetic radiation associated with the switching voltage regulator at any given frequency;
wherein varying comprises varying the position in time of each switch pulse such that occurrence of each switching pulse with respect to its switching cycle is different at successive switching cycles.

2. The method of claim 1, wherein varying comprises randomly or pseudo-randomly varying the position in time and/or width of each switching pulse for each of the plurality of channels.

3. The method of claim 1, and further comprising generating the switching pulses for the plurality of channels such that two or more of the pulses are at different frequencies.

4. The method of claim 3, and further comprising generating the switching pulses such that no two or more of the pulses overlap in time.

5. The method of claim 1, and further comprising generating the switching pulses such that no two or more of the pulses overlap in time.

6. A method for controlling a multiphase switching voltage regulator comprising operating each channel of the switching voltage regulator at a different frequency so that each channel operates at a different frequency and in so doing reduces electromagnetic radiation at a given frequency, and controlling a position in time and/or width of a switching pulse for each channel so that the switching pulses for two or more channels do not overlap in time;
wherein controlling comprises varying the position in time of each switching pulse such that occurrence of each switching pulse with respect to its switching cycle is different at successive switching cycles.

7. The method of claim 6, and further comprising monitoring signals associated with each channel of the switching voltage regulator, and wherein said adjusting is based on said monitoring.

8. The method of claim 7, wherein monitoring comprises monitoring signals supplied to the switching transistors for each channel of the switching voltage regulator.

9. The method of claim 8, wherein monitoring further comprises monitoring a signal connected to a first terminal of an inductor in each channel of the switching voltage regulator.

10. The method of claim 9, wherein monitoring comprises detecting when the signals supplied to the switching transistors and the signal at the first terminal of the inductor crosses a corresponding threshold.

11. The method of claim 6, wherein controlling comprises adjusting the timing and/or width of a switching pulse to a high-side transistor for a channel of the switching voltage regulator separately from the timing and/or width of a switching pulse to a low-side transistor for the same channel of the switching voltage regulator.

12. A method for controlling a multiphase switching voltage regulator comprising: monitoring a signal associated with each of a plurality of channels of the switching voltage regulator that are operated at different frequencies; and adjusting timing of the switching pulses supplied to each of the plurality of channels with respect to a switching cycle for each channel to reduce electromagnetic radiation associated with the switching voltage regulator at any frequency;
wherein adjusting comprises varying the position in time of each switch pulse such that occurrence of each switching pulse with respect to its switching cycle is different at successive switching cycles.

13. The method of claim 12, wherein monitoring comprises comparing a signal from each channel with a threshold and determining a time at which the signal crosses the threshold.

14. The method of claim 13, wherein adjusting comprises adjusting the timing and/or width of a switching pulse based on the time at which the output of the corresponding channel crosses the threshold.

15. The method of claim 12, wherein adjusting comprises adjusting the timing and/or width of the switching pulse to each channel of the switching voltage regulator to prevent overlap in time of switching pulses for two or more channels.

16. The method of claim 12, wherein monitoring comprises monitoring signals supplied to the switching transistors for each channel of the switching voltage regulator.

17. The method of claim 12, wherein adjusting comprises adjusting the timing and/or width of a switching pulse to a high-side transistor for a channel of the switching voltage regulator separately from the timing and/or width of a switching pulse to a low-side transistor for the same channel of the switching voltage regulator.

18. A multiphase voltage regulator system comprising: a. a plurality of channels each having an inductor that is switched by corresponding switching transistors to control the timing of energy storage in a resonant circuit formed by the corresponding inductor and a common capacitor, wherein the inductor in each channel has a different value so that each channel operates at a different frequency and in so doing reduces the amount of electromagnetic radiation at a given frequency;

b. a plurality of driver circuits, one for each of the plurality of channels to drive the switching transistors for each channel in response to a switching pulse; and c. a plurality of control circuits, one for each of the plurality of driver circuits that supplies switching pulses to a corresponding one of the driver circuits to control positions in time of the switching pulses for each channel so that the switching pulses do not overlap in time;

wherein the control circuits are configured to vary the position in time of its corresponding switching pulse such that occurrence of each switching pulse with respect to its switching cycle is different at successive switching cycles.

19. The system of claim 18, wherein each control circuit is responsive to channel state signals representing operation of the corresponding channel of the switching voltage regulator to adjust the timing and/or switch of switching pulses for that channel.

20. The system of claim 19, and further comprising a plurality of monitoring circuits, each of which monitors at least one signal associated with a corresponding channel of the switching voltage regulator to produce a corresponding channel state signal.

21. The system of claim 20, wherein each monitoring circuit compares a value of signal from the corresponding channel with a threshold and determines a time at which the signal crosses the threshold.

22. The system of claim 21, and further comprising a block of monitoring circuits for each channel, wherein each block of monitoring circuits comprises a monitoring circuit that monitors a signal to a high side transistor, a monitoring circuit that monitors a signal to a low side transistor and a monitoring circuit that monitors a signal to the inductor.

23. The system of claim 22, wherein the control circuit is responsive to threshold crossing times supplied by the block of monitoring circuits for a channel to adjust the timing and/or width of the switching pulse to that channel and so as to prevent overlap in time of switching pulses for two or more channels.

24. The system of claim 23, wherein each control circuit comprises a digital waveform synthesizer circuit that produces the switching pulses.

25. The system of claim 24, wherein the digital waveform synthesizer circuit is responsive to a control signal derived from the threshold crossing times to adjust the time and/or width of the switching pulses for a channel.

26. A multiphase voltage regulator system comprising:

a. a plurality of channels each having an inductor that is switched by corresponding switching transistors to control the timing of energy stored in a resonant circuit formed by the corresponding inductor and a common capacitor;

b. a plurality of driver circuits, one for each of the plurality of channels to drive the switching transistors for each channel in response to a switching pulse; and c. a control circuit coupled to the plurality of driver circuits that supplies switching pulses to each driver circuit, wherein the control circuit randomly or pseudo-randomly varies the position in time of each switching pulse with respect to a switching cycle for each of the plurality of channels to reduce electromagnetic radiation associated with the multiphase voltage regulator system on any given frequency;

wherein the control circuit is configured to vary the position in time of each switching pulse such that occurrence of each switching pulse with respect to its switching cycle is different at successive switching cycles.

27. The multiphase voltage regulator system of claim 26, wherein the inductor in each of the channels has a different value so that each channel operates at a different frequency.

28. The multiphase voltage regulator system of claim 27, and further comprising a plurality of control circuits each of which adjusts the timing and/or width of switching pulses to the driver circuit for a corresponding channel and to prevent overlap in time of switching pulses for two or more channels.

29. The multiphase voltage regulator system of claim 28, wherein each control circuit is responsive to channel state signals representing operation of the corresponding channel of the switching voltage regulator to adjust the timing and/or width of switching pulses for the corresponding channel.

* * * * *